United States Patent
Viloria et al.

(10) Patent No.: US 7,737,090 B2
(45) Date of Patent: Jun. 15, 2010

(54) *ALOE* DERIVED SCALE INHIBITOR

(75) Inventors: Alfredo Viloria, Caracas (VE); Luis Castillo, Estado Guarico (VE); Jose A. Garcia, Estado Miranda (VE); Jose Biomorgi, Estado Miranda (VE)

(73) Assignee: INTEVEP, S.A., Caracas (VE)

( * ) Notice: Subject to any disclaimer, the term of this patent is extended or adjusted under 35 U.S.C. 154(b) by 0 days.

(21) Appl. No.: 12/627,035

(22) Filed: Nov. 30, 2009

(65) Prior Publication Data

US 2010/0072419 A1 Mar. 25, 2010

Related U.S. Application Data

(62) Division of application No. 11/443,801, filed on May 30, 2006, now Pat. No. 7,645,722.

(51) Int. Cl.
*C04B 33/04* (2006.01)
*C09K 8/60* (2006.01)
*C09K 8/72* (2006.01)

(52) U.S. Cl. .......................... 507/90; 507/204; 507/215

(58) Field of Classification Search .................. 507/90, 507/204, 215
See application file for complete search history.

(56) References Cited

U.S. PATENT DOCUMENTS

| 2,970,959 | A | 2/1961 | Jones |
| 3,360,511 | A | 12/1967 | Farkas |
| 3,411,580 | A | 11/1968 | McKinney et al. |
| 5,253,711 | A | 10/1993 | Mondshine |
| 7,196,040 | B2 | 3/2007 | Heath et al. |
| 2003/0211182 | A1 | 11/2003 | Maughan et al. |

FOREIGN PATENT DOCUMENTS

| EP | 0559418 A3 | 9/1993 |
| WO | 01/94744 A1 | 12/2001 |

*Primary Examiner*—Timothy J. Kugel
*Assistant Examiner*—Atnaf Admasu
(74) *Attorney, Agent, or Firm*—Bachman & LaPointe, P.C.

(57) ABSTRACT

A method is provided for inhibiting scale in a liquid hydrocarbon system, including the steps of: providing a liquid hydrocarbon system; providing an *aloe*-derived scale inhibitor; and mixing the *aloe*-derived scale inhibitor with the liquid hydrocarbon system in amounts effective to inhibit formation of scale. The scale inhibitor is *aloe* gel dissolved in water at a concentration of between about 5 and about 50% wt/wt, which includes polysaccharides having a hydrocarbon chain structure having carboxyl and alcohol functional groups that interact with divalent ions.

5 Claims, 3 Drawing Sheets

ALOE DERIVED SCALE INHIBITOR

CROSS REFERENCE TO RELATED APPLICATIONS

This application is a U.S. divisional application of U.S. application Ser. No. 11/443,801 filed May 30, 2006.

BACKGROUND OF THE INVENTION

Scale is a condition which affects various aspects of the crude oil production, transportation, and refining industry. One particular area which is affected is secondary reservoirs constituted mainly of inorganic chemical compounds, presented in a system which is at least half man-made. Native fluids of a formation and/or changes in the thermodynamic, kinetic and hydrodynamic conditions under which those fluids exist and are produced can cause scale compounds to form.

Scale can reduce formation porosity and permeability when developed on the pores of the formation, especially when this occurs near the well. Scale can also block regular flow when perforations are obstructed or when a thick layer forms on production pipe walls. Scale can also cover and damage completion equipment such as security valves and gas artificial lift system mandrels.

Scale formation begins when any natural fluid condition is disturbed in a way that exceeds the solubility limit of one or more of its components. The first development is generally either a sodden fluid which is made through formation of unstable atom groups (homogeneous nucleation) or a fluid-flow limiting surface which can cause heterogeneous nucleation.

$CaCO_3$ is one of the more common types of scale. Its precipitation depends on $CO_2$ concentration in the system, brine composition, and temperature and pressure control over the chemical equilibrium between $CO_2$ and reservoir formation waters, according to the following reaction:

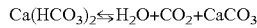

$$Ca(HCO_3)_2 \leftrightarrows H_2O + CO_2 + CaCO_3$$

In fields where water presence is considerable or in those where water injection is used for secondary oil recovery, scale problems can be severe and can increase with time. If this scale is addressed mechanically, the removing methods must be carried out at increasing frequency. Thus, it is generally desirable to prevent scale formation. This can be done as a complementary treatment after mechanical removal of scale.

Existing scale inhibitors have very specific performances, and there is no universal inhibitor for all scale types. Previously, inhibitor efficiency was evaluated by trial and error. Currently, a better understanding of the thermodynamic kinetic mechanism of compound crystal growth allows a better evaluation of the scale inhibitor effectiveness.

In use, inhibitors are injected to the location to be treated either continuously or intermittently. According to the phase where they can be injected, inhibitors are classified as either soluble in organic phase, or soluble in aqueous phase.

The phase in which they are injected is very important since it can affect the inhibitor efficiency. In systems with high water cuts, it is preferred to use an inhibitor which is water soluble, because this phase is the cause of scale incrustation and is the phase with greater contact with internal pipe surfaces. This phase is therefore the better phase for transporting the inhibitor to the metallic surfaces.

Most inhibitors developed to avoid scale are soluble in the aqueous phase because this phase is the main cause of deposit formation. Several researchers have dedicated efforts to understand crystal growth mechanisms that form scale to develop a better inhibitor based on understanding the inhibitor-crystal interaction.

Two ways by which the scale inhibitor operates are known. The first mechanism is the adsorption effect, wherein the inhibitor molecules occupy the nucleation sites which are preferred by the crystals. Thus, crystals cannot find active places to adhere to the surface and, therefore, crystal nucleation is not promoted.

Another inhibitor mechanism is based on an adsorption model, that is, a morphologic change that can prevent formation of crystals in the presence of the inhibitor. Depending on the inhibitor characteristics and the nature of the substrate, it is possible that the inhibitor will be adsorbed over the crystalline net, forming complex surfaces or nets which have difficulty remaining and growing in active places.

Scale inhibitors are generally classified as organic and inorganic. The inorganic types include condensed phosphate, such as polymetaphosphates or dimetallic phosphates.

Inorganic phosphates operate on scale formation through the threshold effect. Through this mechanism, it is not necessary to complex all ions in solution because, when carbonates and calcium sulfur crystals begin to be shaped, they precipitate and, at that moment, phosphate ions cover the small nucleating crystals and crystal growth is atrophied. Coating is given because of phosphate ion adsorption in the crystal surface.

One problem with use of polyphosphates is that in a solution, polyphosphates can suffer hydrolysis or reversion to hydrotreated orthophosphates. Hydrotreated orthophosphates react with calcium to form insoluble calcium phosphates. Temperature, pH, concentration, solution qualities, different types of phosphates and the presence of some enzymes all influence the reversion velocity of these inhibitors.

There are four organic compound groups (polyphosphates, polyphosphonates, polycarboxylic and polymeliates) which have a proven chelant effect over the ions which normally form scale, and these compound groups are used in manufacturing scale inhibitors. Couples of these groups typically are used as follows: (i) phosphonate compounds with alkaline base such as polyphosphates and polyphosphonates, and (ii) weak acids such as polycarboxilyc acid and polymeliates.

The organic phosphate compounds are limited by temperature because they can also revert when exposed to high temperatures. Further, phosphonates are not effective in waters having a high content of calcium ions, and should be applied in large doses.

Polymers obtained from carboxylic acids (that is, polyacrylates) are equally used as scale inhibitors. These compounds tend to distort the crystalline structure of the minerals formed, preventing their adhesion to other crystal and/or to metal surfaces. Temperature of use of these compounds is more stable than the phosphates and phosphonates, however, some polymers have limited tolerance to calcium, generally a maximum concentration of about 2,000 ppm, although some are effective at concentration as high as 5,000 ppm.

For an effective inhibition using these compounds, it is required to inject high polymer concentrations. Taking into account the effectiveness of these compounds at high temperatures (where other products cannot work), this treatment has been considered economical in some instances.

Recently, chelant agents are applied, for example ethylenediaminetetra-acetic acid (EDTA), or its sodium salt, have been used in softening water and/or as scale inhibitor. EDTA forms a soluble and stable complex with magnesium, calcium, strontium, barium and other divalent metals, and this prevents scale formation. This kind of inhibitor does not suffer reversion and is stable at high temperatures. However, these inhibitors are also much more expensive than other products.

Thus, conventional scale inhibitors can be summarized as follows:

| Inhibitor Type | Limitations |
|---|---|
| Inorganic polyphosphates | Suffer hydrolysis and can precipitate as calcium phosphates because of temperature, pH, solution quality, concentration, phosphate type and the presence of some enzymes. |
| Organic polyphosphates | Suffer hydrolysis with temperature. Not effective at high calcium concentrations. Must be applied in high doses. |
| Polymers based on carboxylic acids | Limited calcium tolerance (2,000 ppm) although some can work at concentrations higher than 5,000 ppm Larger concentrations are needed. |
| Ethylenediaminetetra-acetic acid (EDTA) | Very expensive. |

According to what is known about commercial scale inhibitors, the need arises to develop products which reduce the existing limitations and which are flexible in application.

It is the primary object of the present invention to provide a solution to this need.

Other objects and advantages of the present invention will appear herein.

SUMMARY OF THE INVENTION

According to the invention, the foregoing objects and advantages have been attained.

According to the invention, a method is provided for inhibiting the formation of scale, which method comprises the steps of providing a liquid hydrocarbon system; providing an *aloe*-derived scale inhibitor; and mixing the *aloe*-derived scale inhibitor with the liquid hydrocarbon system in amounts effective to inhibit formation of scale.

Still further, according to the invention, a scale inhibitor composition is provided which comprises *aloe* gel dissolved in water at a concentration of between about 5 and about 50% wt/wt. The *aloe* gel comprises polysaccharides, solubilized in water between about 60° C. and about 90° C., and has a hydrocarbon chain structure having carboxyl and alcohol functional groups that interact with divalent ions such as $Ca^{++}$, $Mg^{++}$, and the like.

Unlike chemically synthesized inhibitors that are based on the principles indicated above, the scale inhibitor according to the invention is advantageously based on active ingredients identified in *Aloe* plant gel, especially *Aloe Vera*. Such a scale inhibitor can be applied at low and high calcium concentrations and without the limitation that the composition will precipitate because of hydrolysis. In fact, with the composition according to the invention, hydrolysis favors interaction with ions in the solution and, thus, efficiency as a scale inhibitor increases.

The scale inhibitor according to the invention is also thermally stable up to a temperature of at least approximately 125° C. The inhibitor can therefore be applied in production management surface installations, and in other manufacturing equipment operating at lower temperatures, and in relatively shallow oil wells where such temperatures are not reached.

The present invention advantageously provides a solution to scale problems, and the solution is based upon a composition which is formulated from a plant, and which can be practiced at a decrease in costs because it is not a chemically synthesized compound. The composition of the present invention also reduces environmental impact since it is biodegradable and fosters other local economy sectors such as agriculture.

BRIEF DESCRIPTION OF THE DRAWINGS

A detailed description of preferred embodiments of the present invention follows, with reference to the attached drawings, wherein.

DETAILED DESCRIPTION

The invention relates to a composition and method for inhibiting scale in various industrial and domestic systems, one example of which is a water driven secondary oil production well. Various influences can cause scale formation on surfaces of the facility, and this scale can interfere significantly with proper operation of the facility. According to the invention, a composition is provided which is useful for inhibiting scale formation, and this composition overcomes the various drawbacks of known compositions as outlined above.

According to the invention, the scale inhibitor composition is advantageously derived from *aloe* plants, preferably from *Aloe Vera*, and the composition derived in this manner is not adversely affected by hydrolysis, is suitable for use at temperatures up to at least about 125° C., and is affordably obtained from agricultural sources.

Figure 1:
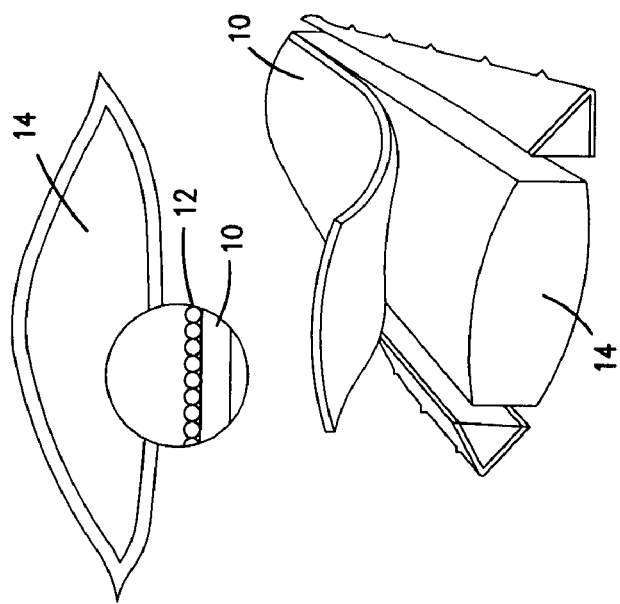
FIG. 1 illustrates an *Aloe Vera* plant and parts of the plant which are starting raw materials for the present invention.

*Aloe Vera* is a xerophile plant originated in tropical or subtropical zones. This plant is characterized by firm and erect lance-shaped leaves with toothed sides and a sharp point. Referring to FIG. 1, the leaf epidermis has a thick cuticle or rind 10. Under the epidermis is the mesophyll which is differentiated by clorenchimas cells and a thin cellular wall, known as parenchyma 20. The cellular parenchyma surrounds a jellied, transparent and mucilaginous material, referred to herein as a gel 30. Moreover, vascular packages of the plant have interior cell packages which contain a yellow sap, or *aloes*, which are found between the two major cells.

According to the invention, the gel of *Aloe Vera* which is used to provide a scale inhibitor. This gel contains various chemical compounds including amino acids, glucosides, minerals and vitamins. The specific composition of a particular specimen is not constant because this composition varies according to soil variations, season of the year, plant age and climate. However, the *aloe* gel does at all times constitute hydrocarbon chain structure having carboxyl and alcohol functional groups. The functional groups interact with, or complex with, divalent ions which cause scale such as Ca++, Mg++ and the like.

The gel represents the succulent part of the leaf once the skin is eliminated. *Aloe* and other xerophile plants stock water when high temperatures evaporate humidity from the soil. Thus, when ambient growing temperatures increase, the quantity of gel in the leaves increases as well.

Figure 2:
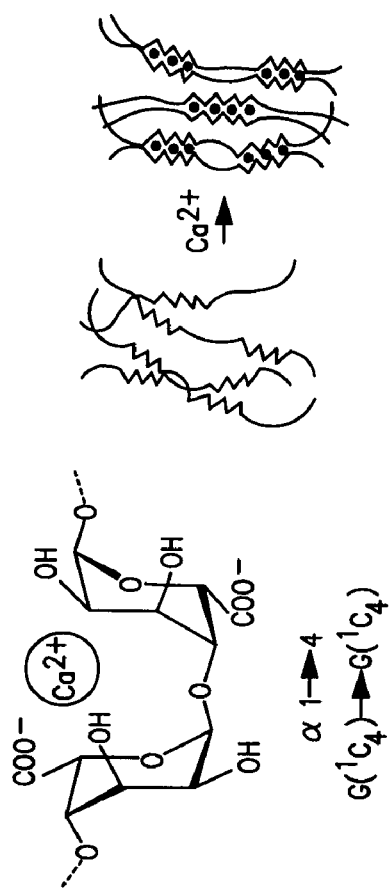
FIG. 2 schematically illustrates an egg-box model showing one mechanism by which the composition of the present invention operates.

*Aloe*-derived gel according to the invention can be used to produce a scale inhibitor having reactivity with calcium to form gels which encapsulate the calcium. This is believed to occur according to an egg-box model (FIG. 2), which assumes that calcium ions serve as a bridge to form ionic liaisons between two carboxyl groups belonging to two different chains in close contact. According to this polysaccharide model, the chains interact with $Ca^{++}$ allowing a structure coordinated packaging. FIG. 2 shows how chains of the gel interact with $Ca^{++}$ to get together. This causes stability when systemic forces or other conditions would otherwise try to revert the gel to an original condition.

The interaction strength between calcium and other oxygen atoms in the polysaccharides implies coordination liaisons used by the calcium empty orbital. Oxygen atoms of the hydroxyl groups, the ring oxygen atom, and the oxygen atoms of sugars combined by hydrogen bridges participate in the liaison process through free electrons. Calcium is favored to complex with polysaccharides because the ionic radius of calcium (0.1 nm) is large enough to coordinate with the spaced oxygen atoms of the gel, and also due to the flexibility presented by the coordinated liaison addresses.

Biopolymers, hydrophilic molecules in a soluble matrix, and other compositions existing in aqueous solutions tend to control $CaCO_3$ crystal formation.

The acid group presence from gels of the present invention, for example such as carboxylic acid (—COOH) in soluble protein molecules, interacts with calcium ions ($Ca^{+2}$), controlling crystallization. Position and distance of the acid groups in the macromolecules can cooperate to put calcium ions together.

On the other hand, biopolymer adsorption in specific faces of the $CaCO_3$ is a key element to control the crystallization process.

Biomacromolecules can induce $CaCO_3$ crystal polyforms. Crystallization with biopolymers induces phase transition of the calcite crystal into aragonite.

According to the invention, a formulation is provided for the manufacture and application of products based on *Aloe* plants, especially *Aloe Vera*, as a scale inhibitor.

The composition of the present invention demonstrates efficiency up to 80% at trial conditions established by the standard NACE TM 0374, while efficiency of commercial inhibitors is only between about 15% and 38% at the same trial conditions.

The composition of the present invention possesses inhibition mechanisms directed to calcium carbonate crystal nucleation changes. The composition also can be used at high and low calcium concentrations. The composition of the present invention does not precipitate because of hydrolysis, and is thermally stable up to 125° C. Use of the composition of the present invention provides a cost reduction because the composition is not chemically synthesized. Finally, the composition and method for making and using same is environmentally friendly technology, and encourages national economy through the encouragement of agro-industry.

The composition of the present invention can be made from a raw material in the form of dehydrated *Aloe Vera* gel, preferably having the characteristics as set forth in Table 1:

TABLE 1

*Aloe Vera* gel characterization.

| Property | Average |
|---|---|
| Chemical structure | Hydrocarbon chain structure with carboxyl (COOH) and alcohol (OH) functional groups |
| Elemental composition | C 29.0-32.0; H 4.2-6.5; O 44.0-55.0; N 0.4-0.8; S 0.3-1.6; Ca 2.3-5.2; Mg 0.8-1.0; P 0.3-0.4. |
| Average molecular weight, determined by viscosimetry | 25 KDa (kilo-Dalton) |
| Thermal stability | Up to 125° C. |

While in solution, *Aloe Vera* gel has properties as set forth in Table 2 below:

TABLE 2

*Aloe Vera* gel aqueous solution characterization.

| Property | Average |
|---|---|
| pH | 3.8 |
| Calcium | 3.75% wt/wt |
| Magnesium | 0.9% wt/wt |
| Acidity (TAN) | 18.33 meqKOH/g |
| Intrinsic viscosity | 0.4 dL/g |
| Fluid type | Newtonian |
| Critical Concentration | 15% wt/wt |

The composition set forth above is representative of the raw material (Table 1) used in preparation of the composition of the present invention, and a preferred embodiment of the resulting gel solution (Table 2). Of course, other starting raw materials can be used well within the broad scope of the present invention.

The scale inhibitor composition of the present invention is a solution of *aloe* gel in water, preferably at a concentration of between about 5 and 50% wt/wt, more preferably between about 10 and about 25% wt/wt, most preferably 15% wt/wt.

Two methods were used to formulate scale inhibitors according to the present invention. The resulting products are referred to herein as Bio-Inh1 and Bio-Inh2. As demonstrated below, each of these products has well defined scale inhibitor characteristics.

EXAMPLE 1

Preparation of Bio-Inh1

A crop of *Aloe Vera* plants was developed, and isolation and purification of the *Aloe Vera* gel was conducted using known techniques such as those disclosed in US2003/0211182A1. The *Aloe Vera* gel is processed to sterilize and stabilize same. The sterilized and stabilized *Aloe Vera* gel is then dissolved in $H_2O$, stirring continuously at a temperature of between about 60 and about 90° C. to prevent enzymatic reactions and/or bacteria agent actions that cause organic material degradation.

Figure 3:
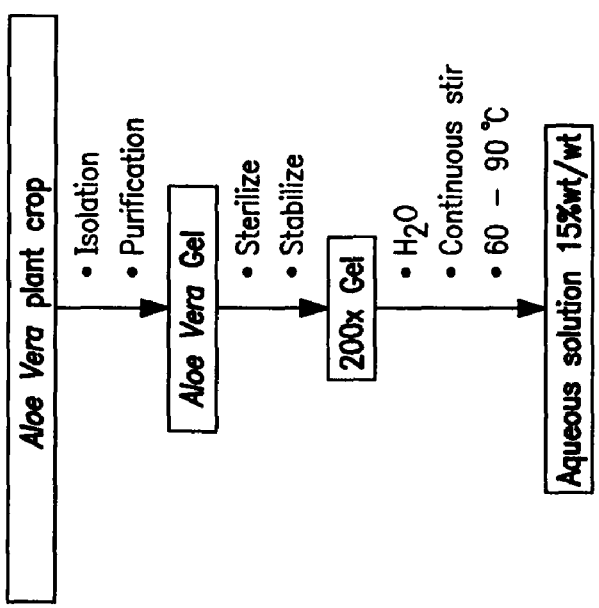
FIG. 3 schematically illustrates the steps of formation of the composition of Example 1.

A solution of the gel in water was formulated having a concentration of between about 5 and about 50% wt/wt. An abrupt change in solution conductivity and viscosity is observed, especially at a concentration of about 15% wt/wt. This concentration is therefore desirable and is applied to a system to inhibit scale. FIG. 3 schematically illustrates this formulation process.

EXAMPLE 2

Preparation of Bio-Inh2

A crop of plants was developed, and isolation and purification of the *Aloe Vera* gel was conducted using known techniques. The *Aloe Vera* gel is sterilized and stabilized. A 20 gram sample of *Aloe Vera* gel was mixed with 100 ml of methanol. This mixture was continuously stirred for 10 minutes, and then decanted for 30 minutes. The resulting product was filtrated, and the insoluble fraction was collected. This fraction is referred to herein as the MPS (Solid Precipitable Methanol, polysaccharides plus a salt complex insoluble in alcohol, and organic acids). The MPS was dried in a heater at 30-50° C. for 2 hours to produce sterilized and stabilized MPS. The sterilized and stabilized MPS is then dissolved in $H_2O$, stirring continuously at a temperature of between about 60 and about 90° C. to prevent enzymatic reactions and/or bacteria agent actions that cause organic material degradation.

Figure 4:
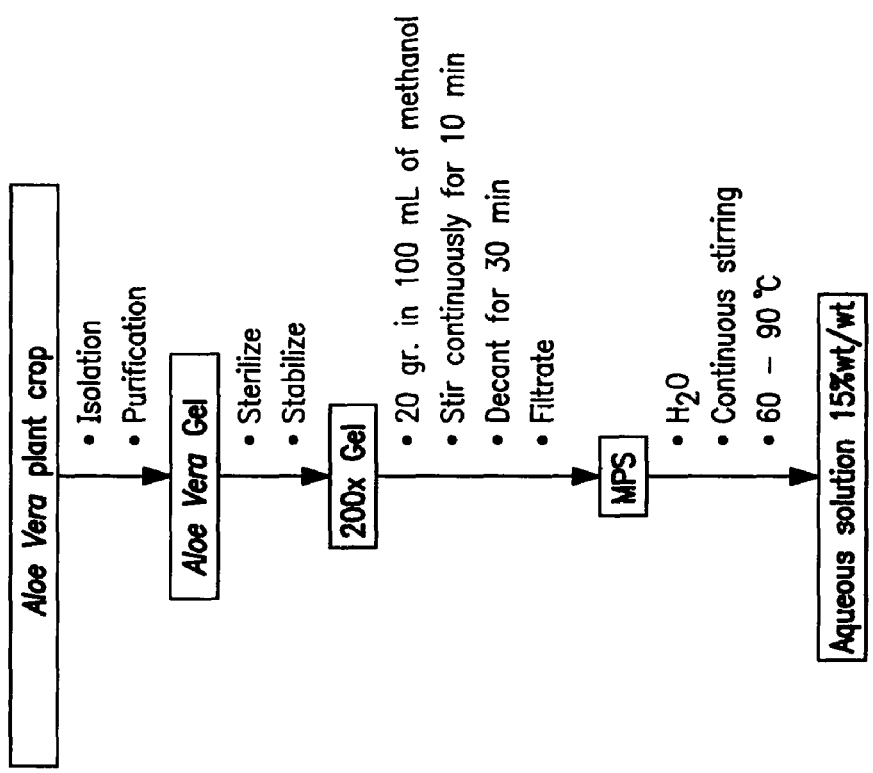
FIG. 4 schematically illustrates the steps of formation of the composition of Example 2.

A solution was formulated having a concentration of between about 5 and about 50% wt/wt. An abrupt change in solution conductivity and viscosity is observed, especially at a concentration of about 15% wt/wt. This concentration is therefore desirable and is applied to a system to inhibit scale. FIG. 4 schematically illustrates this formulation process.

Figure 5:
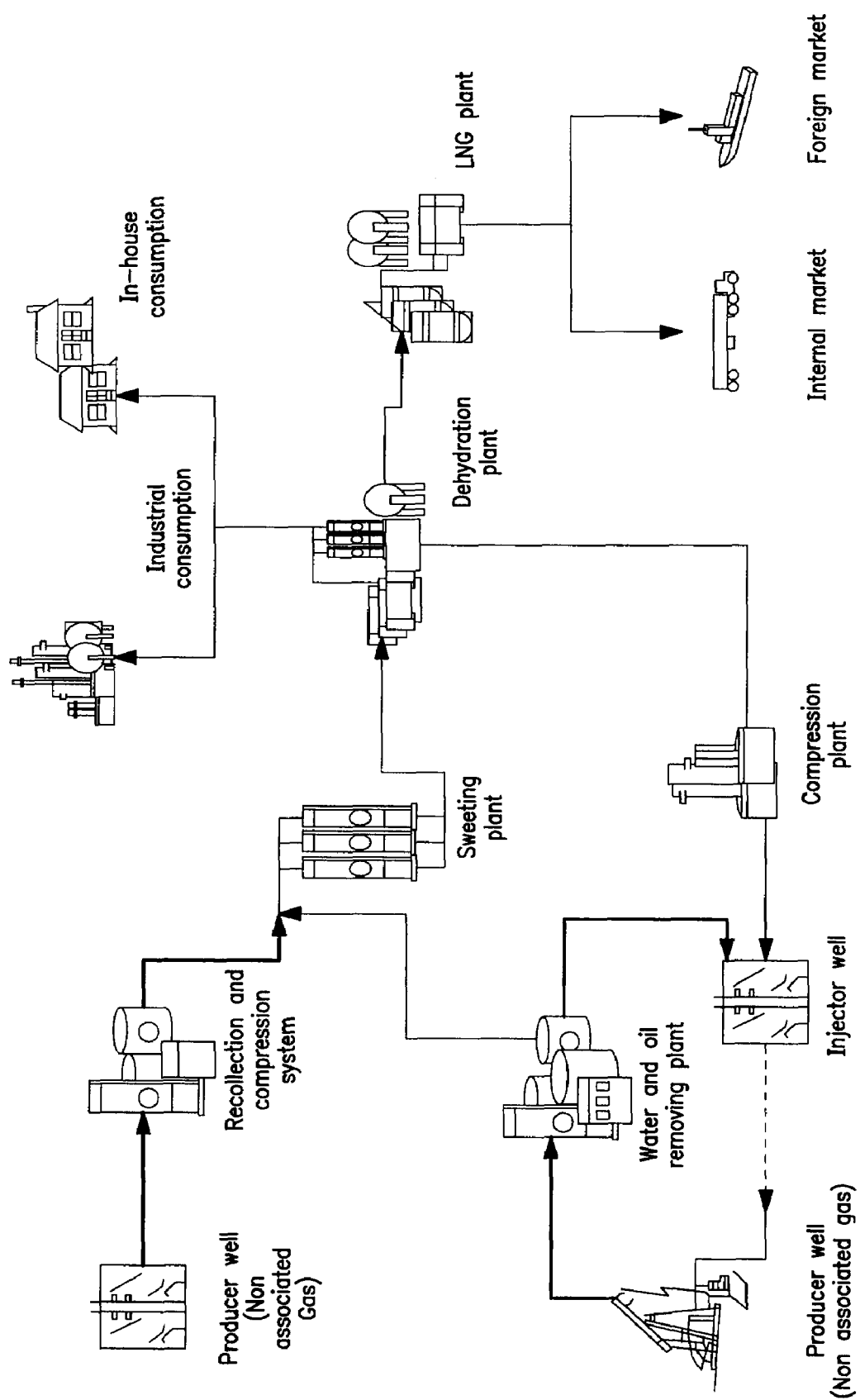
FIG. 5 schematically illustrates various industrial and domestic processes with which the composition and method of the present invention can be utilized.

The Bio-Inh1 and Bio-Inh2 products were formulated to solve scale problems presented in the oil and gas value chain, and exhibit excellent properties in this use. It should also be noted, however, that they can also be used in processes involving water management that involve inorganic compound precipitation processes due to hardness, such as heat exchange equipment, and many others. In this regard, FIG. 5 schematically illustrates a wide variety of oil and gas value chain process stages where the composition of the present invention can advantageously be utilized. Examples of such process stages include, hydrocarbon producing wells, collection and compression systems, injector wells, water and oil separation plants, sweetening plants, dehydration plants, industrial consumption sites, domestic consumption sites, LGN plants and transportation facilities.

It should be appreciated that the present invention provides a process of formulation, manufacture and application of a scale inhibitor based on the active principles identified in *aloe*-derived plant gel, especially *Aloe Vera*. The present invention has advantages over existing commercial products because it can be applied at low and high calcium concentrations and does not precipitate due to hydrolysis. In fact, with compounds of the present invention, hydrolysis favors interaction of the composition with ions in the solution, thereby increasing the efficiency as a scale inhibitor. Further, compositions according to the invention are thermally stable to temperatures of at least about 125° C. Thus, the composition can be applied on production management surface installations, industrial equipment operating at acceptable temperatures and in shallow to moderately deep wells where such temperatures are not reached.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

The invention claimed is:

1. An *aloe*-derived scale inhibitor, comprising *aloe* gel dissolved in water at a concentration of between about 5 and about 50% wt/wt, wherein the *aloe* gel comprises polysaccharides having a hydrocarbon chain structure having carboxyl and alcohol functional groups that interact with divalent ions.

2. The *aloe*-derived scale inhibitor of claim 1, wherein the *aloe*-derived scale inhibitor is thermally stable up to a temperature of at least about 125° C.

3. The *aloe*-derived scale inhibitor of claim 1, wherein the *aloe*-derived scale inhibitor has an average molecular weight of between about 15 and about 50 KDa.

4. The *aloe*-derived scale inhibitor of claim 1, wherein the *aloe* derived scale inhibitor is soluble in water.

5. The *aloe*-derived scale inhibitor of claim 1, wherein the *aloe* gel comprises polysaccharides which complex with divalent ions.

\* \* \* \* \*